(12) United States Patent
Salinger

(10) Patent No.: US 8,374,743 B2
(45) Date of Patent: Feb. 12, 2013

(54) METHOD AND APPARATUS FOR DRIVER CONTROL OF A LIMITED-ABILITY AUTONOMOUS VEHICLE

(75) Inventor: Jeremy A. Salinger, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 819 days.

(21) Appl. No.: 12/434,058

(22) Filed: May 1, 2009

(65) Prior Publication Data

US 2009/0287367 A1 Nov. 19, 2009

Related U.S. Application Data

(60) Provisional application No. 61/053,728, filed on May 16, 2008.

(51) Int. Cl.
*G01C 22/00* (2006.01)
*G05D 1/00* (2006.01)
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G06F 7/00* (2006.01)
*G06F 17/00* (2006.01)
*G06F 19/00* (2011.01)
*B60T 7/12* (2006.01)

(52) U.S. Cl. ............... 701/23; 701/25; 701/28; 701/41; 701/98

(58) Field of Classification Search .................. 701/23, 701/96, 41, 25, 28
See application file for complete search history.

(56) References Cited

U.S. PATENT DOCUMENTS

| | | | | |
|---|---|---|---|---|
| 6,347,278 | B2 * | 2/2002 | Ito | 701/200 |
| 7,075,456 | B2 * | 7/2006 | Tanaka et al. | 340/932.2 |
| 7,317,973 | B2 * | 1/2008 | Dieterle | 701/23 |
| 8,035,531 | B2 * | 10/2011 | Yoshihashi et al. | 340/932.2 |
| 2009/0040068 | A1 | 2/2009 | Oyobe et al. | |

FOREIGN PATENT DOCUMENTS

| | | |
|---|---|---|
| KR | 10-0280851 B1 | 4/2001 |
| KR | 10-2005-0094518 A | 9/2005 |
| WO | WO 01-60650 A1 | 8/2001 |
| WO | WO 2005-084993 A1 | 9/2005 |

* cited by examiner

Primary Examiner — Khoi Tran
Assistant Examiner — Nicholas Kiswanto
(74) Attorney, Agent, or Firm — John A. Miller; Miller IP Group, PLC

(57) ABSTRACT

A vehicle system for providing an interface for driver control of at least a partially autonomous vehicle. The system includes a driver command processor that receives request signals from a driver interface device of the driver's desire for the vehicle system to take certain actions and sends appropriate signals in response thereto to the proper autonomous vehicle systems. The driver command processor also sends signal to a display device indicating available actions, acknowledgement of the driver request, status of actions being taken or to be taken, etc.

21 Claims, 4 Drawing Sheets

METHOD AND APPARATUS FOR DRIVER CONTROL OF A LIMITED-ABILITY AUTONOMOUS VEHICLE

CROSS-REFERENCE TO RELATED APPLICATIONS

This application claims the benefit of the priority date of U.S. Provisional Patent Application Ser. No. 61/053,728, titled Method and Apparatus for Driver Control of a Limited-Ability Autonomous Vehicle, filed May 16, 2008.

BACKGROUND OF THE INVENTION

1. Field of the Invention

This invention relates generally to a system and method for controlling at least a partially autonomous vehicle and, more particularly, to a system and method for controlling at least a partially autonomous vehicle that includes a driver interface for providing driver requests in connection with the autonomous control.

2. Discussion of the Related Art

The operation of modern vehicles is becoming more autonomous, i.e., being able to provide driving control with less and less driver intervention. Cruise control systems have been on vehicles for a number of years where the vehicle operator can set a particular speed of the vehicle, and the vehicle will maintain that speed without the driver operating the throttle. Adaptive cruise control systems have been developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect the vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a completely autonomous vehicle. For example, future vehicles probably will employ autonomous systems for lane changing, passing, turns away from traffic, turns into traffic, etc. As these systems become more prevalent in vehicle technology, it will also be necessary to determine what the driver's role will be in combination with these systems for controlling vehicle speed and steering, and overriding the autonomous system.

SUMMARY OF THE INVENTION

In accordance with the teachings of the present invention, a vehicle system is disclosed for providing an interface for driver control of at least a partially autonomous vehicle. The system includes a driver command processor that receives request signals from a driver interface device of the driver's desire for the vehicle system to take certain actions and sends appropriate signals in response thereto to the proper autonomous vehicle systems. The driver command processor also sends signals to a display device indicating available actions, acknowledgement of the driver request, status of actions being taken or to be taken, etc.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a driver control interface and associated processor for at least a partially autonomous vehicle is merely exemplary in nature, and is in no way intended to limit the invention or its applications or uses.

The present invention proposes a system and method for an interface between a vehicle driver and a partially autonomous vehicle system or systems that provides for informing the driver when a command is required by the vehicle or that other driver actions are required, an input device for a driver to indicate which maneuver the vehicle is to execute next, a device for transmitting the command to the vehicle, and a device to determine that a driver or devices has taken manual control of the vehicle. The input device provides alternatives arranged in a physical configuration that correspond to the direction of the motion that is desired.

Figure 1:
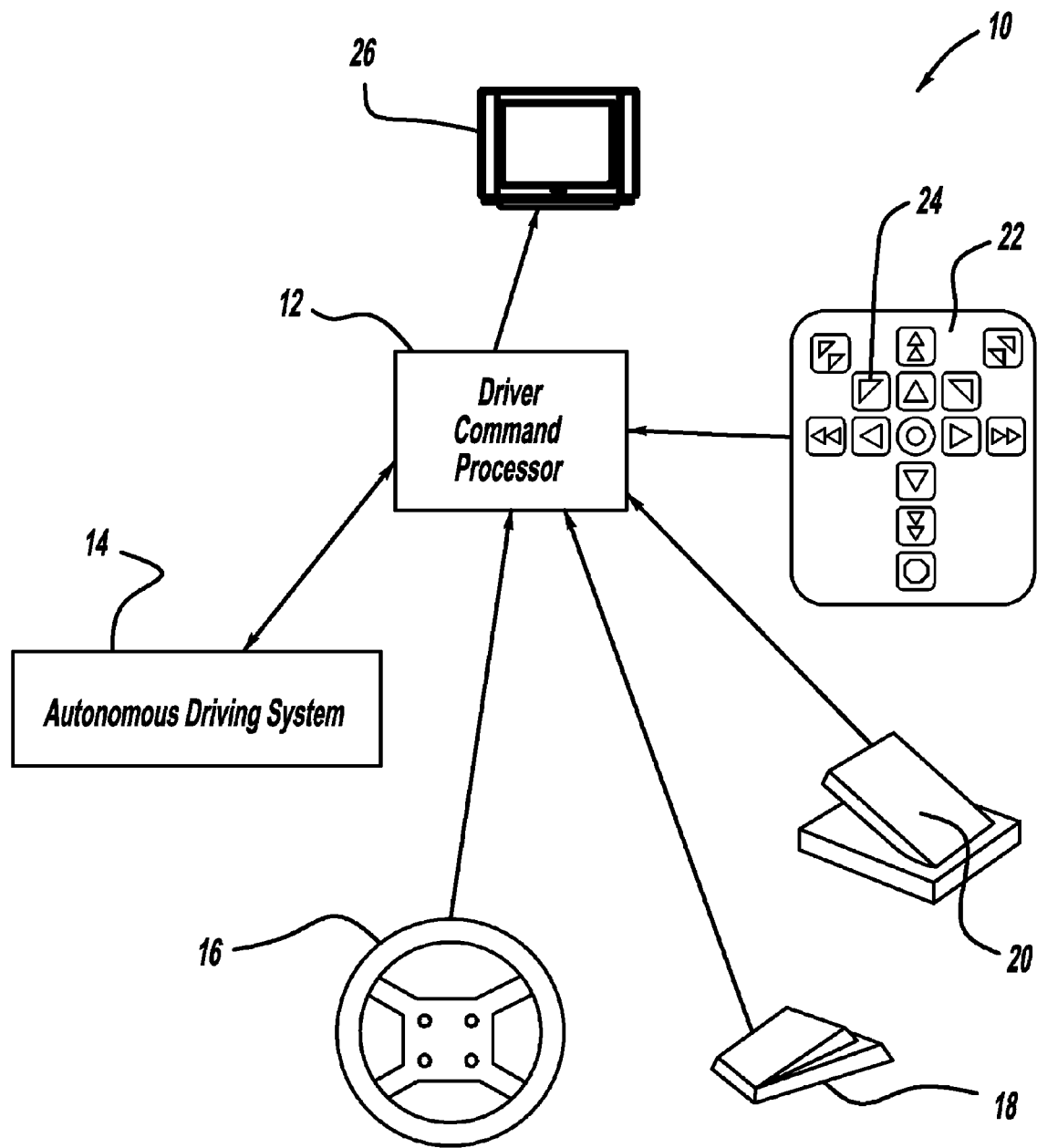
FIG. 1 is an illustration of a vehicle system that includes an autonomous driving system, a driver command processor and a driver command input device, according to an embodiment of the present invention.

FIG. 1 is an illustration of a vehicle system 10 that includes a driver command processor 12 that provides an interface between an autonomous driving system 14 and other vehicle devices and systems that control the operation of the vehicle, according to an embodiment of the present invention. The autonomous driving system 14 can provide any suitable type of at least partially autonomous vehicle operations, as will be discussed in further detail below. The driver command processor 12 receives signals from a vehicle steering system 16 indicating that the vehicle operator is steering the vehicle, a vehicle accelerator pedal 18 indicating how much power is being requested by the vehicle operator and a vehicle brake 20 indicating that the vehicle operator is braking the vehicle.

Additionally, the system 10 includes a vehicle driver interface 22 to the driver command processor 12 that includes a series of buttons 24, described in detail below, that provide requests to the processor 12 indicating what the driver would like the vehicle to do. The driver command processor 12 can include any suitable algorithm consistent with the discussion herein that would process a particular vehicle maneuver signal from the interface 22, and then send control signals to suitable devices in the autonomous driving system 14. One of skill in the art will readily recognize and be able to provide such algorithms consistent with the discussion herein. These request signals are processed in the processor 12, and provided to the autonomous driving system 14 that causes the vehicle to operate accordingly. The system 10 also includes a display 26 that can display any function suitable for the operation of the system 10 as described herein, such as vehicle course, selection options for vehicle control, control options selected, etc.

Figure 2:
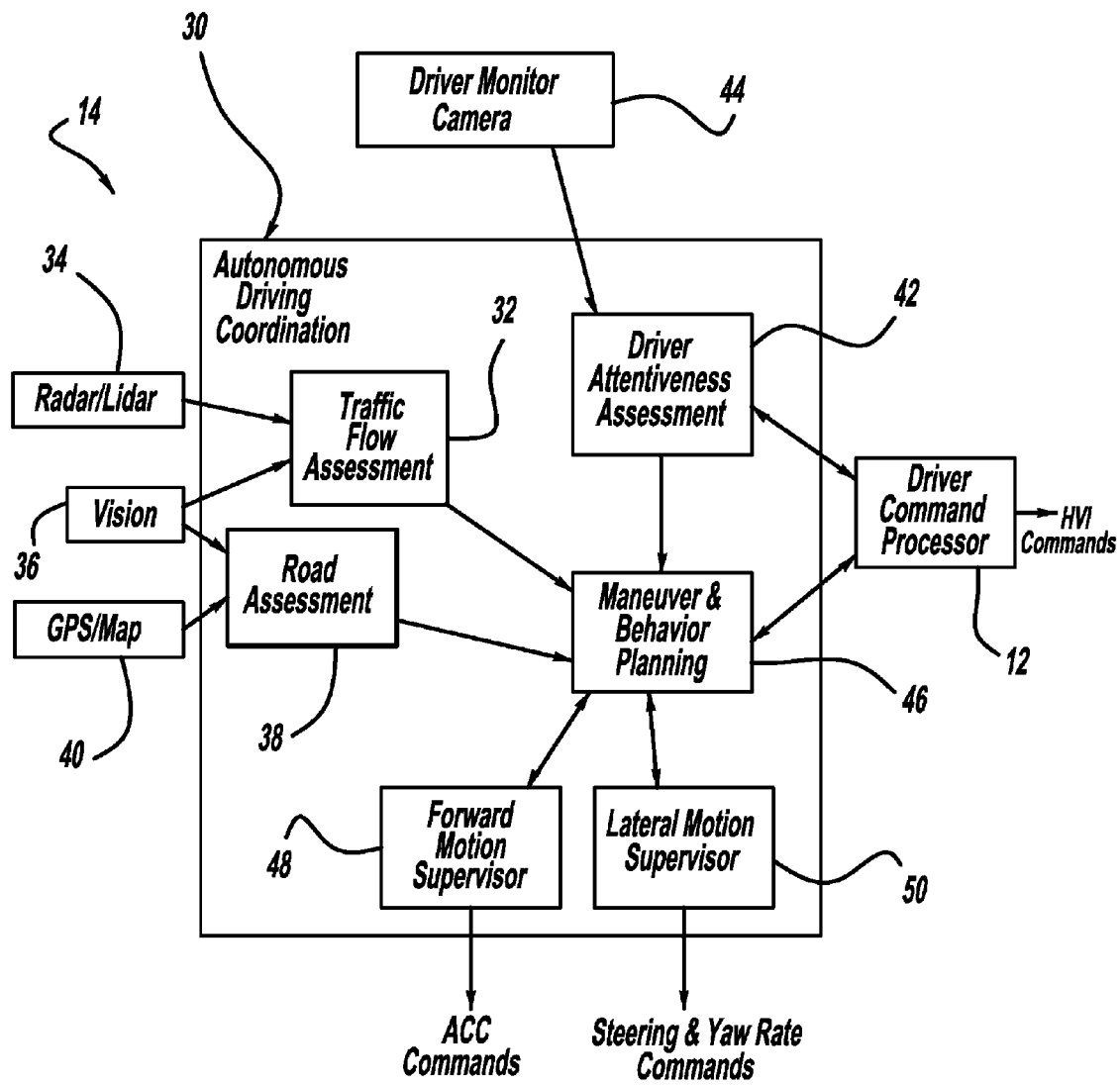
FIG. 2 is a block diagram of various vehicle sub-systems in combination with the autonomous driving system shown in FIG. 1.

FIG. 2 is a block diagram showing a non-limiting, representative illustration of the autonomous driving system 14 in connection with the driver command processor 12. The autonomous driving system 14 includes an autonomous driving coordinator 30 that provides control of the system 14. In other words, various inputs from sensors, detectors, radar, cameras, GPS, etc. are required to allow the driving system 14 to detect the driving environment, and be able to drive the vehicle autonomously. The discussion below gives merely representative examples of sub-systems that may be provided in the autonomous driving system 14 with the understanding that other sub-systems may also be employed.

The driving coordinator 30 includes a traffic flow assessment sub-system 32 that provides signals of forecasted traffic flow. The traffic assessment sub-system 32 can receive signals from vehicle radar and/or lidar devices 34, vision devices 36, etc. The autonomous driving coordinator 30 also includes a road assessment sub-system 38 that provides road forecast signals, such as curves in the road, forks in the road, lane endings, slippery roads, etc. The road assessment sub-system 38 can receive signals from the vision device 36, a GPS receiver and/or map database 40, etc. The autonomous driving coordinator 30 also includes a driver attentiveness assessment sub-system 42 that provides signals as to how attentive, such as drowsy, awake, etc., the vehicle driver is. The driver attentiveness assessment sub-system 42 can receive signals from a driver monitoring camera 44 and other information about the driver's activities to determine the driver attentiveness assessment.

The autonomous driving coordinator 30 can also include a maneuver and behavior planning sub-system 46 that provides suitable signals to various vehicle devices and controllers based on the various input signals. Particularly, the maneuver and behavior planning sub-system 46 receives the traffic flow forecast signals from the traffic flow assessment sub-system 32, the road forecast signals from the road assessment sub-system 38, the driver responsiveness signals from the driver attentiveness assessment sub-system 42 and the driver's autonomous driving behavior requests from the driver command processor 12 that may be input from the interface 22. Using this data, the maneuver and behavior planning sub-system 46 will control the various vehicle devices that provide autonomous vehicle driving signals to, for example, a forward motion supervisor 48 and a lateral motion supervisor 50. The forward motion supervisor 48 can provide adaptive cruise control (ACC) commands to the appropriate vehicle devices, such as an adaptive cruise control controller, the engine controller and/or the brake controller. The lateral motion supervisor 50 can provide steering and yaw rate command signals to the appropriate vehicle devices, such as a lane centering sub-system and steering actuators.

Figure 3:
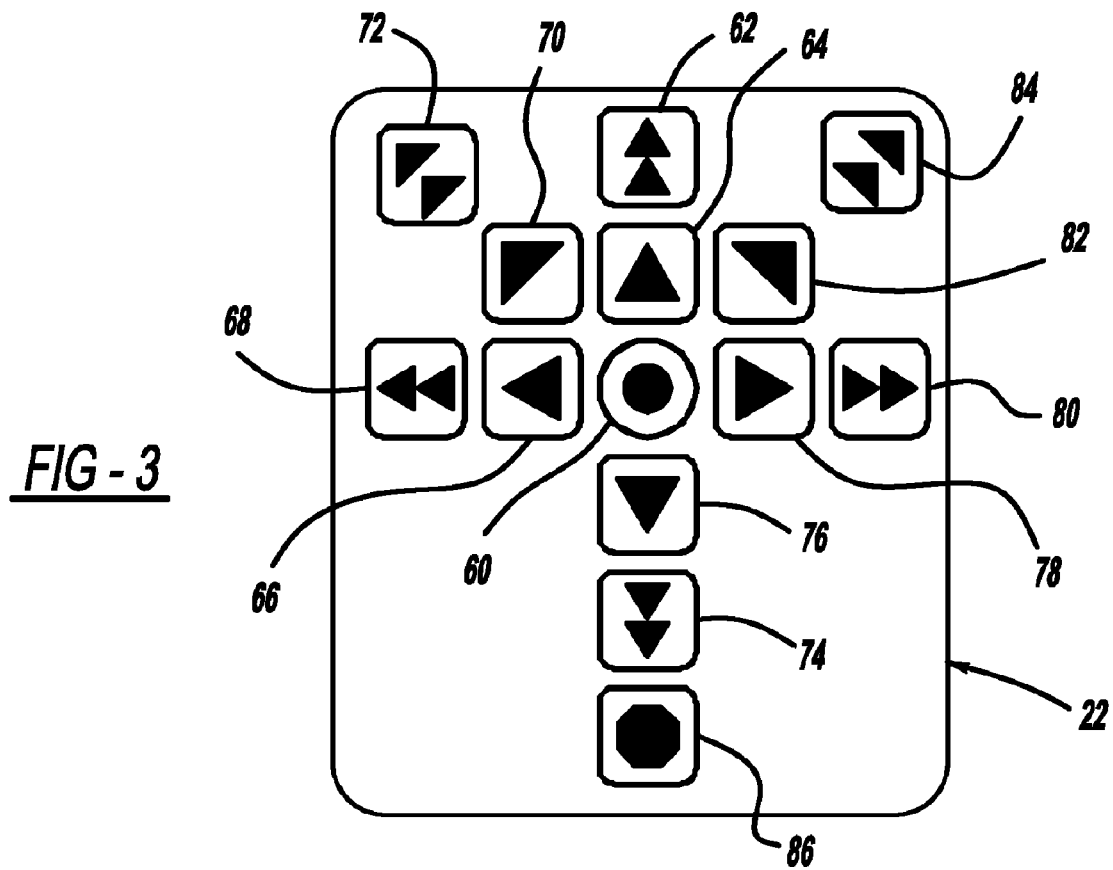
FIG. 3 is an illustration of the driver command input device for road travel maneuvers shown in FIG. 1.

FIG. 3 is a top view of the interface 22 including the buttons 24 shown in FIG. 1. The buttons 24 are oriented and arranged on the interface 22 in an arrow pattern that conforms with the travel direction of the vehicle and the particular command given by the vehicle operator. Particularly, the vehicle operator can push one of the buttons 24 to cause the vehicle to autonomously perform the vehicle maneuver. In this non-limiting embodiment, the buttons 24 include a button 60 for providing a continue in present lane request; a button 62 for providing a speed up or go if stopped request; a button 64 for a follow the preceding vehicle more closely request; a button 66 for a change lanes to the left request; a button 68 for a turn left request; a button 70 for a merge to the left request; a button 72 for a follow a left fork in the road request; a button 74 for a slow down request; a button 76 for a fall back from a preceding vehicle request; a button 78 for a change lanes to the right request; a button 80 for a turn right request; a button 82 for a merge to the right request; a button 84 for a follow a right fork in the road request; and a button 86 for a stop at the next intersection request.

Although the interface 22 with the buttons 24 is used in this non-limiting embodiment, other suitable interfaces may include a joystick, a touch screen display, a toy car or other representation of the vehicle that is pushed, pulled or turned to indicate the maneuver the driver wants the vehicle to execute, etc.

In one embodiment of the present invention, the combination of the driver interface 22 and the driver command processor 12 is intended to be one of a relationship between a novice driver and a coach or teacher of the novice driver. In this relationship, the autonomous driving system 14 operates as the novice driver that may be unfamiliar with a certain area and/or may not have complete confidence in its driving ability. The vehicle driver will act as the teacher, and interject commands as discussed that either tell the autonomous driving system 14 that it is doing the right thing or tell the autonomous driving system 14 to make some sort of vehicle maneuver. For example, as the vehicle is autonomously being driven down the road, and encounters other vehicles, merging lanes, exit ramps, stop signs, freeway off ramps, etc., selections may be displayed on the display 26 requiring the vehicle operator to either make a selection for the vehicle system 14 to act on, or to provide a command that tells the system 14 to maintain the present course as each option is encountered.

Figure 4:
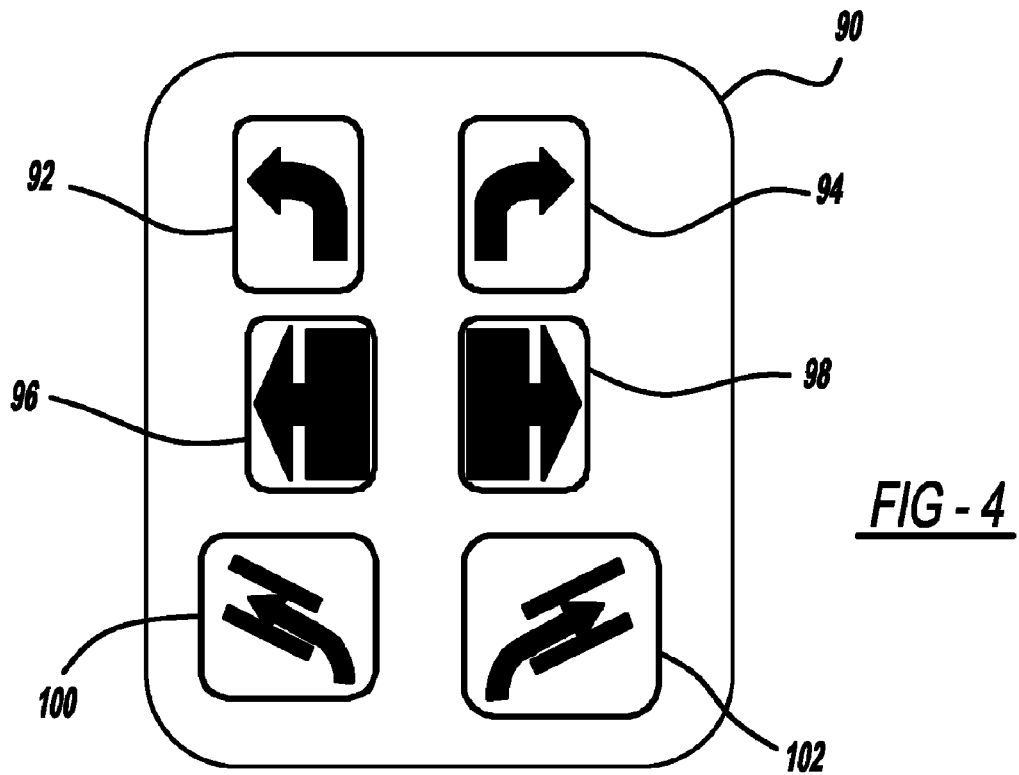
FIG. 4 is an illustration of a driver command input device for providing low speed maneuvers, according to an embodiment of the present invention.

The discussion above of the buttons 24 on the interface 22 are intended to be merely representative. In another embodiment, an interface can be provided for other vehicle requests, such as low speed vehicle maneuvers, where the interface is the only interface provided or is another interface to the interface 22. Such an interface 90 is shown in FIG. 4. The interface 90 includes a button 92 for a turn left into the next drive request; a button 94 for a turn right into the next drive request; a button 96 for a parallel park in the next spot on the left request; a button 98 for a parallel park in the next spot on the right request; a button 100 for an angle park in the next spot on the left request; and a button 102 for an angle park in the next spot on the right request. The interface 90 can also be part of the interface 22.

Figure 5:
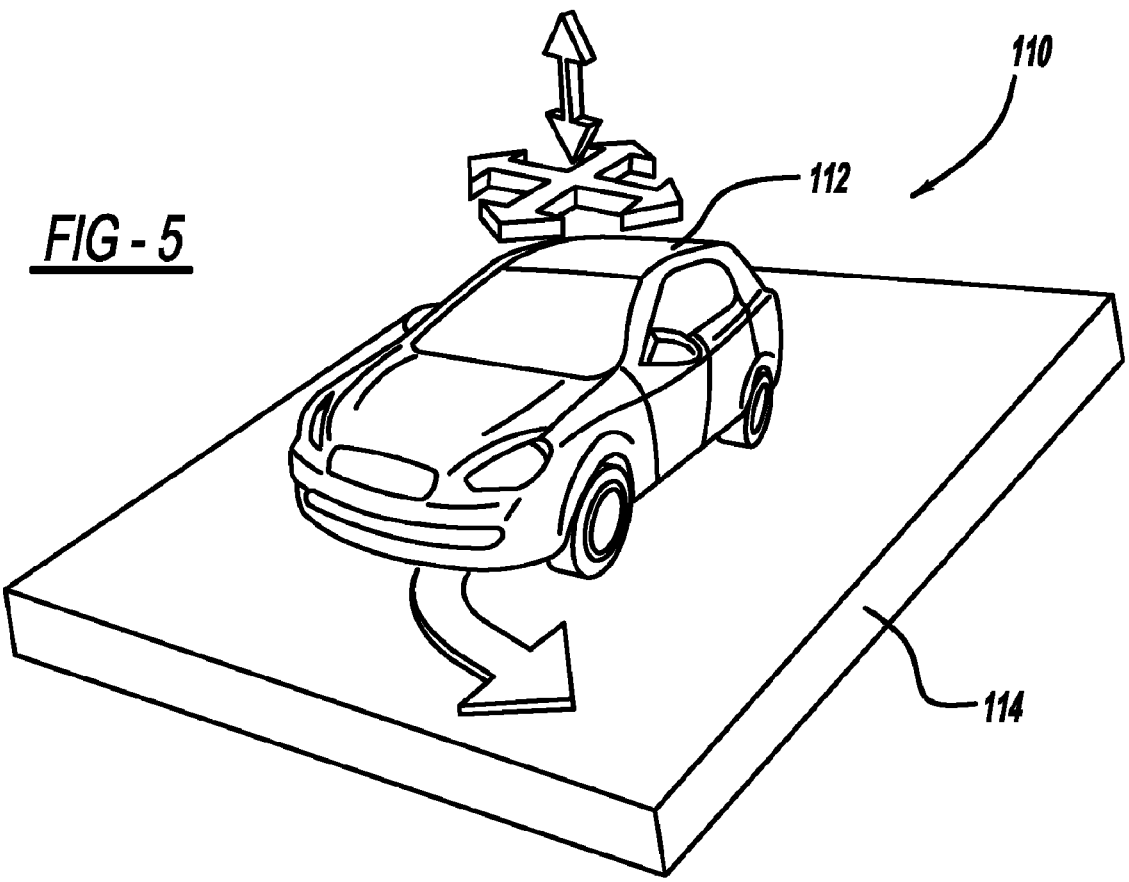
FIG. 5 is a perspective view illustrating a driver command input device as a car for road travel maneuvers.

As mention above, other interface devices can be employed to provide the driver commands. FIG. 5 is a perspective view of another command interface device 110 that includes a toy car 112. The car 112 is mounted to a platform 114 in such a manner that car 112 can be moved left, can be moved right, can be moved forward, can be moved backward, can be moved upward, can be moved downward, can be pivoted and can be rotated. Each of the movements can provide any suitable request, such as those discussed above.

Figure 6:
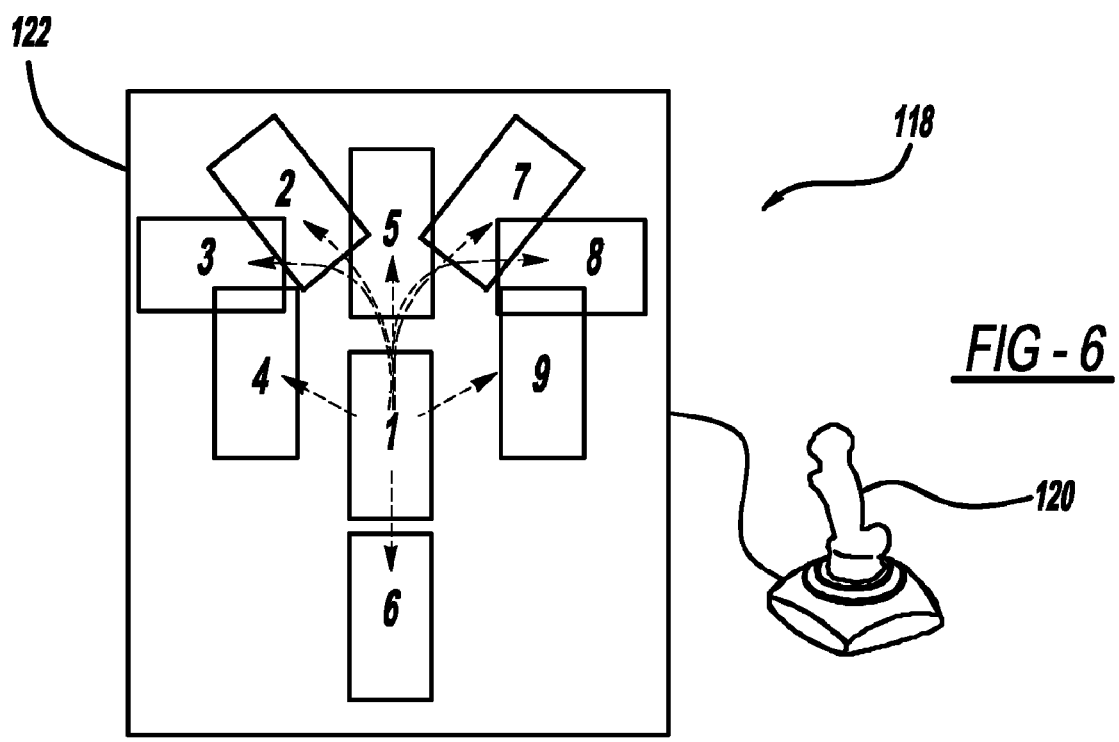
FIG. 6 is an illustration of a driver command input device as a joy stick for road travel maneuvers.

FIG. 6 is a top plan view of a driver command device 118 including a joy stick 120 and a platform 122 that is also applicable to provide driver input commands. For example, putting the joy stick in position 1 could be a command for stay in the present lane, putting the joy stick in position 2 could be a command for follow left fork or merge left, putting the joy stick in position 3 could be a command for turn left, putting the joy stick in position 4 could be a command for change lanes to the left, putting the joy stick in position 5 could be a command for follow closer or speed up, putting the joy stick in position 6 could be a command for follow farther or slow down, putting the joy stick in position 7 could be a command for follow right fork or merge right, putting the joy stick in position 8 could be a command to turn right, and putting the joy stick in position 9 could be a command for change lanes to the right.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle system for providing control between a vehicle driver and at least a partially autonomous driving system, said vehicle system comprising:

at least one driver interface device that allows the vehicle driver to input driving request signals for specific vehicle maneuvers, where the vehicle maneuvers include following more closely or less closely, lane changes, turns, merges and parking maneuvers, and where the at least one driver interface device includes an interface device having a plurality of buttons and each button provides a particular driving maneuver, including turning, parallel parking and angle parking maneuvers, wherein the plurality of buttons on the interface device are arranged in an arrow type configuration where buttons for forward vehicle requests are at the front of the arrow, buttons for slower vehicle requests are towards the back of the arrow, buttons for left vehicle requests are at the left side of the arrow and buttons for right vehicle requests are at the right side of the arrow;

a display device for displaying requests and operations of the vehicle system; and a driver command processor responsive to the driving request signals and to signals identifying driver-requested vehicle braking, vehicle steering and vehicle throttle control, said driver command processor providing driving signals to the autonomous driving system that cause the autonomous driving system to autonomously operate the vehicle to perform maneuvers in response to the driving signals and providing signals to the display device for displaying selected vehicle operations.

2. The vehicle system according to claim 1 wherein the plurality of buttons include one or more of a button for a continue in the present lane request, a button for a speed up request, a button for a follow more closely request, a button for a change lane to the left request, a button for a turn left request, a button for a merge left request, a button for a following a left fork request, a button for a slow down request, a button for a follow farther back request, a button for a change lane to the right request, a button for a turn right request, a button for a merge right request, a button for a follow right fork request and a button for a stop request.

3. The vehicle system according to claim 1 wherein the at least one driver interface device includes an interface device having a plurality of buttons including a button for a turn left into a next drive request, a button for a parallel park in the next spot on the left request, a button for an angle park in the next spot on the left request, a button for a turn right into next drive request, a button for a parallel park in next spot on the right request, and a button for an angle park in next spot on the right request.

4. The vehicle system according to claim 1 wherein the at least one driver interface device includes a shaped device that provides driver requests by moving the shaped device left, right, forward, backward, up, down and rotationally.

5. The vehicle system according to claim 4 wherein the shaped device is a toy car.

6. The vehicle system according to claim 1 wherein the at least one driver interface device includes a joy stick that provides driver requests by moving the joy stick left, right, forward, backward or rotationally.

7. The vehicle system according to claim 1 wherein the at least partially autonomous driving system includes an autonomous driving coordinator that coordinates the driver request signals and other data for autonomous driving subsystems.

8. The vehicle system according to claim 7 wherein the other data includes traffic flow assessment data, road assessment data and driver attentiveness data.

9. The vehicle system according to claim 1 wherein the display device displays options for various driving maneuvers that the driver can select.

10. A vehicle system for providing control between a vehicle driver and at least a partially autonomous driving system, said vehicle system comprising:

at least one driver interface device that allows the driver to input driving request signals, said at least one driver interface device including an interface device having a plurality of buttons where each button provides a particular driving maneuver, and wherein the plurality of buttons are arranged so that buttons for forward vehicle requests are towards the front of the interface device, buttons for slower vehicle requests are towards the back of the interface device, buttons for left vehicle requests are towards the left side of the interface device and buttons for right vehicle requests are towards the right side of the interface device;

a display device for displaying operations of the vehicle system and options for the driver to select various driving maneuvers; and a driver command processor responsive to the driving request signals, said driver command processor providing driving signals to the autonomous driving system that cause the autonomous driving system to autonomously operate the vehicle in response to the driving signals and providing signals to the display device for displaying selected vehicle operations.

11. The vehicle system according to claim 10 wherein the plurality of buttons include one or more of a button for a continue in the present lane request, a button for a speed up request, a button for a follow more closely request, a button for a change lane to the left request, a button for a turn left request, a button for a merge left request, a button for a following a left fork request, a button for a slow down request, a button for a follow farther back request, a button for a change lane to the right request, a button for a turn right request, a button for a merge right request, a button for a follow right fork request and a button for a stop request.

12. The vehicle system according to claim 10 wherein the at least one driver interface includes an interface device having a plurality of buttons including a button for a turn left into a next drive request, a button for a parallel park in the next spot on the left request, a button for an angle park in the next spot on the left request, a button for a turn right into next drive request, a button for a parallel park in next spot on the right request, and a button for an angle park in next spot on the right request.

13. The vehicle system according to claim 10 wherein the at least partially autonomous driving system includes an autonomous driving coordinator that coordinates the driver request signals and other data for autonomous driving subsystems.

14. The vehicle system according to claim 13 wherein the other data includes traffic flow assessment data, road assessment data and driver attentiveness data that may override the autonomous driving.

15. The vehicle system according to claim 10 wherein the driver command processor receives signals identifying driver-requested vehicle braking, vehicle steering and vehicle throttle control.

16. The vehicle system according to claim 10 wherein the at least one driver interface device includes a joy stick that provides driver commands by moving the joy stick left, right, forward or backward.

17. The vehicle system according to claim 10 wherein the at least one driver interface device includes a shaped device that provides driver requests by moving the shaped device left, right, forward, backward, up, down and rotationally.

18. A vehicle system for providing control between a vehicle driver and at least a partially autonomous driving system, said vehicle system comprising:
- at least one driver interface device that allows the vehicle driver to input driving request signals for specific vehicle maneuvers, where the vehicle maneuvers include following more closely or less closely, lane changes, turns, merges and parking maneuvers, wherein the at least one driver interface device includes an interface device having a plurality of buttons including a button for a turn left into a next drive request, a button for a parallel park in the next spot on the left request, a button for an angle park in the next spot on the left request, a button for a turn right into next drive request, a button for a parallel park in next spot on the right request, and a button for an angle park in next spot on the right request;
- a display device for displaying requests and operations of the vehicle system; and
- a driver command processor responsive to the driving request signals and to signals identifying driver-requested vehicle braking, vehicle steering and vehicle throttle control, said driver command processor providing driving signals to the autonomous driving system that cause the autonomous driving system to autonomously operate the vehicle to perform maneuvers in response to the driving signals and providing signals to the display device for displaying selected vehicle operations.

19. A vehicle system for providing control between a vehicle driver and at least a partially autonomous driving system, said vehicle system comprising:
- at least one driver interface device that allows the vehicle driver to input driving request signals for specific vehicle maneuvers, where the vehicle maneuvers include following more closely or less closely, lane changes, turns, merges and parking maneuvers, wherein the at least one driver interface device includes a shaped device that provides driver requests by moving the shaped device left, right, forward, backward, up, down and rotationally;
- a display device for displaying requests and operations of the vehicle system; and
- a driver command processor responsive to the driving request signals and to signals identifying driver-requested vehicle braking, vehicle steering and vehicle throttle control, said driver command processor providing driving signals to the autonomous driving system that cause the autonomous driving system to autonomously operate the vehicle to perform maneuvers in response to the driving signals and providing signals to the display device for displaying selected vehicle operations.

20. The vehicle system according to claim 19 wherein the shaped device is a toy car.

21. A vehicle system for providing control between a vehicle driver and at least a partially autonomous driving system, said vehicle system comprising:
- at least one driver interface device that allows the vehicle driver to input driving request signals for specific vehicle maneuvers, where the vehicle maneuvers include following more closely or less closely, lane changes, turns, merges and parking maneuvers, wherein the at least one driver interface device includes a joy stick that provides driver requests by moving the joy stick left, right, forward, backward or rotationally;
- a display device for displaying requests and operations of the vehicle system; and
- a driver command processor responsive to the driving request signals and to signals identifying driver-requested vehicle braking, vehicle steering and vehicle throttle control, said driver command processor providing driving signals to the autonomous driving system that cause the autonomous driving system to autonomously operate the vehicle to perform maneuvers in response to the driving signals and providing signals to the display device for displaying selected vehicle operations.

\* \* \* \* \*